United States Patent
Oh et al.

(10) Patent No.: US 12,500,269 B2
(45) Date of Patent: Dec. 16, 2025

(54) NON-AQUEOUS ELECTROLYTE SOLUTION FOR LITHIUM SECONDARY BATTERY, AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Chul Haeng Lee, Daejeon (KR); Yu Ha An, Daejeon (KR); Sung Guk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 494 days.

(21) Appl. No.: 18/080,111

(22) Filed: Dec. 13, 2022

(65) Prior Publication Data
US 2023/0187696 A1    Jun. 15, 2023

(30) Foreign Application Priority Data
Dec. 15, 2021   (KR) .................. 10-2021-0180099

(51) Int. Cl.
*H01M 10/0567* (2010.01)
*H01M 4/505* (2010.01)
*H01M 4/525* (2010.01)
*H01M 10/0525* (2010.01)
*H01M 4/02* (2006.01)

(52) U.S. Cl.
CPC ....... *H01M 10/0567* (2013.01); *H01M 4/505* (2013.01); *H01M 4/525* (2013.01); *H01M 10/0525* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | |
|---|---|---|
| 2018/0358655 A1 | 12/2018 | Kono et al. |
| 2019/0237804 A1 | 8/2019 | Shi et al. |
| 2019/0245244 A1 | 8/2019 | Lim et al. |
| 2020/0044287 A1 | 2/2020 | Kim et al. |
| 2020/0251777 A1* | 8/2020 | Lim ............... C07D 233/58 |
| 2022/0131192 A1 | 4/2022 | Kim et al. |
| 2022/0140391 A1 | 5/2022 | Kim et al. |
| 2022/0223911 A1 | 7/2022 | Kim et al. |
| 2022/0263133 A1* | 8/2022 | Shi ............... C07D 317/10 |
| 2022/0376303 A1 | 11/2022 | Lim et al. |

FOREIGN PATENT DOCUMENTS

| | | |
|---|---|---|
| EP | 4391136 A1 | 6/2024 |
| JP | 4362992 B2 | 11/2009 |
| JP | 2019537814 A | 12/2019 |
| KR | 20170132239 A | 12/2017 |
| KR | 20190004232 A | 1/2019 |
| KR | 20190008100 A | 1/2019 |
| KR | 20200089623 A | 7/2020 |
| KR | 20200105227 A | 9/2020 |
| KR | 102167592 B1 | 10/2020 |
| KR | 20210023756 A | 3/2021 |
| KR | 20210138937 A | 11/2021 |
| KR | 20210142847 A | 11/2021 |
| WO | 2016158986 A1 | 10/2016 |

OTHER PUBLICATIONS

International Search Report for Application No. PCT/KR2022/019890 mailed Mar. 17, 2023, pp. 1-3. [See p. 2, categorizing the cited references].
Extended European Search Report including Written Opinion for Application No. 22907840.7 dated Sep. 10, 2024. 12 pgs.

* cited by examiner

*Primary Examiner* — Wyatt P McConnell
(74) *Attorney, Agent, or Firm* — Lerner David LLP

(57) ABSTRACT

The present disclosure provides a non-aqueous electrolyte solution for a lithium secondary battery, and a lithium secondary battery including the non-aqueous electrolyte solution. Specifically, the non-aqueous electrolyte solution for a lithium secondary battery may include a lithium salt, a non-aqueous organic solvent, a first additive comprising a compound represented by Formula 1, at least one second additive selected from the group consisting of vinylethylene carbonate (VEC) and ethyl di(pro-2-yn-1-yl) phosphate (EDP), and at least one third additive selected from the group consisting of a cyclic carbonate compound and a compound represented by Formula 2.

15 Claims, No Drawings

NON-AQUEOUS ELECTROLYTE SOLUTION FOR LITHIUM SECONDARY BATTERY, AND LITHIUM SECONDARY BATTERY INCLUDING THE SAME

CROSS-REFERENCE TO RELATED APPLICATIONS

This application claims the benefit from Korean Patent Application No. 10-2021-0180099, filed on Dec. 15, 2021, the disclosures of which are incorporated herein by reference.

TECHNICAL FIELD

The present disclosure relates to a non-aqueous electrolyte solution for a lithium secondary battery, the non-aqueous electrolyte solution including an additive having excellent effects of scavenging decomposition products generated from a lithium salt and enhancing SEI, and a lithium secondary battery including the non-aqueous electrolyte solution, thereby having excellent high-temperature durability.

BACKGROUND ART

In recent years, as personal IT devices and computer networks have been developed due to the development of an information society and the society's reliance on electric energy is increased overall, there is a need for the development of a technology for efficiently storing and utilizing electric energy.

Particularly, with the emerging interests in solving environmental problems and realizing a sustainable, circular society, research on lithium ion secondary batteries, which are in the spotlight as clean energy with low carbon dioxide emissions, is being conducted extensively.

A lithium ion secondary battery can be made small enough to be applied to personal IT devices and the like, and has the advantage in that its energy density and working voltage are high, and thus, is employed not only as a power source for laptop computers, mobile phones, etc., but also as a power source for power storage and a power source for electric vehicles.

Meanwhile, a lithium ion secondary battery is provided with a positive electrode having a lithium-containing transition metal oxide as a main component, a negative electrode using a carbonaceous material typified by a lithium alloy or graphite, a separator interposed between the positive electrode and the negative electrode, and a non-aqueous electrolyte solution. The non-aqueous electrolyte solution is a medium through which Li ions move, and a non-aqueous electrolyte solution in which an electrolyte such as lithium hexafluorophosphate ($LiPF_6$) is dissolved in an organic solvent having a high dielectric constant, such as ethylene carbonate or dimethyl carbonate, is used.

However, the electrolyte such as lithium hexafluorophosphate ($LiPF_6$) is vulnerable to heat and moisture, and thus, reacts with moisture present in a cell, or is decomposed, thereby generating a Lewis acid such as $PF_5$. Such a Lewis acid may cause a decomposition reaction of an organic solvent such as ethylene carbonate, and may also erode a passivation film formed on an electrode-electrolyte interface, thereby causing additional decomposition of an electrolyte solution and elution of transition metal ions from a positive electrode.

The eluted transition metal ions promote the decomposition of the electrolyte, thereby accelerating gas generation, or are re-deposited on the positive electrode, thereby increasing resistance of the positive electrode, and also, are transferred to a negative electrode through the electrolyte solution and then deposited on the negative electrode, thereby causing additional consumption of lithium ions due to self-discharge of the negative electrode, destruction and regeneration of a solid electrolyte interphase (SEI) film, and the like, resistance increase, and the like.

Therefore, there is a demand for a non-aqueous electrolyte solution composition capable of improving battery performance such as high-rate charge/discharge properties as well as safety by scavenging by-products (HF, $PF_5$, etc.) generated due to the thermal decomposition of a lithium salt, and at the same time, by forming a stable film on the surface of an electrode to suppress the elution of a transition metal, or suppress the deposition of eluted transition metal ions on a negative electrode.

DISCLOSURE OF THE INVENTION

Technical Problem

An aspect of the present disclosure provides a non-aqueous electrolyte solution for a lithium secondary battery, the non-aqueous electrolyte solution including an additive capable of improving effects of scavenging decomposition products generated from a lithium salt and enhancing SEI.

Another aspect of the present disclosure provides a lithium secondary battery including the non-aqueous electrolyte solution for a lithium secondary battery, thereby having improved high-temperature durability.

Technical Solution

According to an aspect of the present disclosure, there is provided a non-aqueous electrolyte solution for a lithium secondary battery, the non-aqueous electrolyte solution including
- a lithium salt,
- a non-aqueous organic solvent,
- a first additive comprising a compound represented by Formula 1 below,
- a second additive comprising vinylethylene carbonate (VEC), ethyl di(pro-2-yn-1-yl) phosphate (EDP), or a combination thereof, and
- a third additive including a cyclic carbonate compound except for vinylethylene carbonate (VEC), a compound represented by Formula 2 below, or a combination thereof.

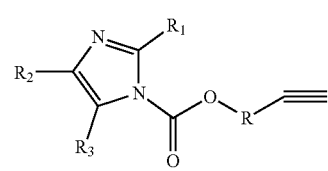

(Formula 1)

In Formula 1,
R is a substituted or unsubstituted alkylene group having 1 to 3 carbon atoms, and
$R_1$ to $R_3$ are each independently hydrogen, an alkyl group having 1 to 3 carbon atoms, or —CN.

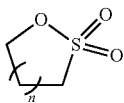

[Formula 2]

In Formula 2, n is an integer of 1 or 2.

According to another aspect of the present disclosure, there is provided a lithium secondary battery including
a negative electrode, a positive electrode, a separator interposed between the negative electrode and the positive electrode, and
the non-aqueous electrolyte solution for a lithium secondary battery of the present disclosure.

Advantageous Effects

A compound included in a non-aqueous electrolyte solution for a lithium secondary battery of the present disclosure and represented by Formula 1 is a Lewis base-based compound including, in its structure, a propargyl group (—C≡C—) and a nitrogen element having a unshared electron pair, and is capable of easily scavenging a Lewis acid generated as an electrolyte decomposition product inside a battery during charge/discharge and forming a robust film on the surface of a positive electrode, thereby suppressing a side reaction between the positive electrode and the electrolyte solution at high temperatures.

In addition, the non-aqueous electrolyte solution of the present disclosure includes a first additive, a second additive and a third additive capable of forming a stable film on an electrode surface, thereby forming a more robust passivation film on the electrode surface to suppress side reactions between an electrode and the electrolyte solution, and to implement an effect of suppressing an increase in resistance. A lithium secondary battery with improved high-temperature durability may be implemented when the non-aqueous electrolyte solution of the present disclosure is included.

DETAILED DESCRIPTION OF THE INVENTION

Hereinafter, the present disclosure will be described in more detail.

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the invention.

In the present specification, when terms such as "include," "provided with," "composed of," "has," and the like are used, other parts may be added unless 'only' is used. Elements of a singular form may include elements plural forms unless the context clearly indicates otherwise.

In the present specification, "%" means wt % unless otherwise noted.

In addition, in the present disclosure, the term "alkylene group" refers to a branched or unbranched divalent unsaturated hydrocarbon group. In an embodiment, the alkylene group may be substituted or unsubstituted. The alkylene group includes, but is not limited to, a methylene group, an ethylene group, a propylene group, an isopropylene group, a butylene group, an isobutylene group, a tert-butylene group, a pentylene group, a 3-pentylene group, and the like, each of which may be optionally substituted in another embodiment.

In general, a lithium secondary battery may secure high-temperature storage properties as a non-aqueous electrolyte solution is decomposed during an initial charging/discharging and forms a film having a passivation capability on the surfaces of positive and negative electrodes. However, the film may be deteriorated by a Lewis acid material, such as HF and $PF_5$, which is generated due to thermal decomposition of a lithium salt ($LiPF_6$, etc.) widely used in a lithium ion secondary battery. That is, when transition metal elements are eluted from the positive electrode by the attack of the Lewis acid material, there is a change in the structure of the surface, resulting in an increase in the surface resistance of the electrode, and as the metal elements, which are redox centers, are lost, a theoretical capacity may decrease, thereby decreasing an expression capacity. In addition, the eluted transition metal ions as described above are deposited on the negative electrode which reacts in a strong reduction potential band, and consume electrons, and also, destroy the film when deposited, thereby exposing the surface of the negative electrode, and thus, may cause an additional non-aqueous electrolyte decomposition reaction. As a result, there is a problem in that the negative electrode resistance and irreversible capacity increase to cause the capacity of a cell to continuously degrade.

Therefore, the present disclosure is to provide a non-aqueous electrolyte solution for a lithium secondary battery, non-aqueous electrolyte solution including an additive having excellent effects of scavenging decomposition products generated from a lithium salt and enhancing SEI, and a lithium secondary battery including the non-aqueous electrolyte solution.

Non-Aqueous Electrolyte Solution for Lithium Secondary Battery

According to an embodiment, the present disclosure provides a non-aqueous electrolyte solution for a lithium secondary battery, the non-aqueous electrolyte solution including
a lithium salt,
a non-aqueous organic solvent,
a first additive comprising a compound represented by Formula 1 below,
a second additive comprising vinylethylene carbonate (VEC), ethyl di(pro-2-yn-1-yl) phosphate (EDP), or a combination thereof, and
a third additive including a cyclic carbonate compound except for vinylethylene carbonate (VEC), a compound represented by Formula 2 below, or a combination thereof.

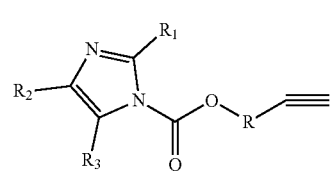

(Formula 1)

In Formula 1,

R is a substituted or unsubstituted alkylene group having 1 to 3 carbon atoms, and $R_1$ to $R_3$ are each independently hydrogen, an alkyl group having 1 to 3 carbon atoms, or —CN.

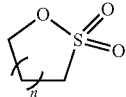
[Formula 2]

In Formula 2,
n is an integer of 1 or 2.

(1) Lithium Salt

First, the lithium salt will be described.

Any lithium salt typically used in an electrolyte solution for a lithium secondary battery may be used without limitation as the lithium salt, and for example, the lithium salt may include $Li^+$ as cations, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlO_{14}^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as anions.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (Lithium bis(fluorosulfonyl)imide, LiFSI), $LiN(SO_2CF_2CF_3)_2$ (lithium bis(perfluoroethanesulfonyl)imide, LiBETI), and $LiN(SO_2CF_3)_2$ (lithium bis(trifluoromethanesulfonyl) imide, LiTFSI), or a mixture of two or more thereof, and particularly, $LiPF_6$, $LiBF_4$, or the like having high ion conductivity may be used.

Meanwhile, when the organic solvent of the non-aqueous electrolyte solution is decomposed under a high-temperature environment condition, a decomposition product of the organic solvent and the anions of the lithium salt may react and generate a Lewis acid by-product. For example, as shown in the following reaction equation, when $LiPF_6$ is used as the lithium salt, a Lewis acid by-product such as $PF_5$ is generated. The Lewis acid by-product generates by-products including HF as a result of the following chain chemical reactions, thereby promoting a spontaneous decomposition reaction of the organic solvent, and causing a side reaction resulting in the collapse of a SEI film formed on an electrode interface.

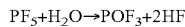

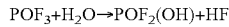

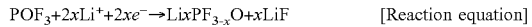  [Reaction equation]

Meanwhile, the content of the lithium salt may be appropriately changed within a typical range in which a lithium salt may be used, but in order to obtain an optimum effect of forming an anti-corrosive film on the surface of an electrode, the lithium salt may be included in the electrolyte solution at a concentration of 0.8 M to 3.0 M, specifically 1.0 M to 3.0 M.

When the concentration of the lithium salt satisfies the above range, the viscosity of the non-aqueous electrolyte solution may be controlled to implement optimal impregnation, and the mobility of lithium ions may be improved to obtain an effect of improving the capacity properties and cycle properties of a lithium secondary battery.

(2) Non-Aqueous Organic Solvent

In addition, the non-aqueous organic solvent will be described as follows.

As the non-aqueous organic solvent, various organic solvents typically used in a non-aqueous electrolyte solution may be used without limitation, and as long as decomposition caused by an oxidation reaction and the like during a charging and discharging process of a secondary battery may be minimized, and desired properties may be exhibited together with an additive, the type thereof is not limited.

Specifically, the non-aqueous organic solvent may include a cyclic carbonate-based organic solvent, a linear carbonate-based organic solvent, a linear ester-based organic solvent, or a mixed organic solvent thereof.

The cyclic carbonate-based organic solvent is a high-viscosity organic solvent which has a high dielectric constant, and thus, is capable of dissociating a lithium salt well in an non-aqueous electrolyte solution, and specific examples thereof may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and among them, may include ethylene carbonate.

The linear carbonate-based organic solvent is an organic solvent having low viscosity and a low dielectric constant, and specific examples thereof may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and specifically, may include ethylmethyl carbonate (EMC).

Compared to a cyclic carbonate-based organic solvent, the linear ester-based organic solvent is a solvent which is relatively highly stable during high-temperature and high-voltage driving, so that the disadvantage of the cyclic carbonate-based organic solvent which causes gas generation during high-temperature driving may be suppressed, and at the same time, a high ion conductivity rate may be achieved.

As a specific example, the linear ester-based organic solvent may include at least one selected from the group consisting of methyl acetate, ethyl acetate, propyl acetate, methyl propionate, ethyl propionate, propyl propionate, and butyl propionate, and specifically, may include at least one of ethyl propionate and propyl propionate.

The non-aqueous electrolyte solution of the present disclosure may further include, if necessary, a cyclic ester-based organic solvent.

In addition, the cyclic ester-based organic solvent may include at least one selected from the group consisting of γ-butyrolactone, γ-valerolactone, γ-caprolactone, σ-valerolactone, and ε-caprolactone.

Meanwhile, unless otherwise stated, the rest of the non-aqueous electrolyte solution except for the lithium salt and the first to third additives may all be non-aqueous organic solvents.

(3) First Additive

The non-aqueous electrolyte solution for a lithium secondary battery of the present disclosure may comprise a compound represented by Formula 1 below as a first additive.

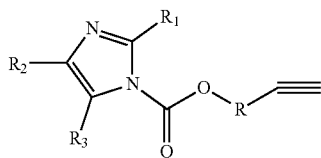

(Formula 1)

In Formula 1,

R is a substituted or unsubstituted alkylene group having 1 to 3 carbon atoms, and $R_1$ to $R_3$ are each independently hydrogen, an alkyl group having 1 to 3 carbon atoms, or —CN.

Specifically, the unshared electron pair of the nitrogen element included in the compound represented by Formula 1 above stabilizes the anions of the lithium salt to suppress the generation of a Lewis acid such as HF and $PF_5$, which are decomposition products of the anions, and at the same time, the nitrogen element acts as a Lewis base to remove the Lewis acid generated in the electrolyte solution, so that the deterioration behavior of a film on the surface of a positive electrode or a negative electrode may be suppressed, and accordingly, additional decomposition of the electrolyte solution may be prevented. As a result, the self-discharge of a secondary battery may be reduced to improve high-temperature storage properties.

In addition, the compound represented by Formula 1 above includes, in its structure, a propargyl functional group easily reduced on the surface of a negative electrode, and thus, may form an SEI film with a high passivation capability on the surface of the negative electrode to prevent an additional reduction decomposition reaction of the electrolyte solution occurring due to the instability of an SEI film, and may improve high-temperature durability of the negative electrode itself, so that a self-discharge reaction of the negative electrode may be suppressed. Particularly, the propargyl group included in the compound represented by Formula 1 above may be adsorbed onto the surface of metallic impurities included in a positive electrode to suppress the elution of the impurities, so that metal ions may be suppressed from being deposited on the surface of the negative electrode to prevent internal short circuit.

Specifically, in Formula 1, R may be a substituted or unsubstituted alkylene group having 1 carbon atom or 2 carbon atoms, and $R_1$ to $R_3$ may each be independently hydrogen or an alkyl group having 1 carbon atom or 2 carbon atoms.

In addition, in Formula 1, R may be a substituted or unsubstituted alkylene group having 1 carbon atom or 2 carbon atoms, and $R_1$ to $R_3$ may each be hydrogen.

Preferably, the compound represented by Formula 1 may be a compound represented by Formula 1a below.

[Formula 1a]

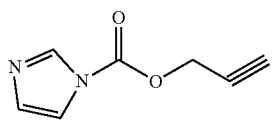

The first additive is included in an amount of 0.05 wt % to 5 wt % based on the total weight of the non-aqueous electrolyte solution.

When the first additive is included in the above content range, the effect of scavenging decomposition products of the lithium salt is excellent which suppressing disadvantages, such as side reactions caused by an additive, a decrease in capacity, and an increase in resistance, to the maximum, so that it is possible to manufacture a secondary battery with further improved overall performance.

Specifically, when the first additive is included in an amount of 0.05 wt % or greater, the effect of scavenging HF or $PF_5$ may be maintained during repeated charge/discharge. In addition, when the first additive is included in an amount of 5.0 w or less, side reactions caused by an additive may be prevented, and at the same time, an increase in viscosity of the electrolyte solution may be prevented to suppress a decrease in ion conductivity thereby, so that degradation in rate properties or low-temperature lifespan properties during high-temperature storage may be prevented.

Specifically, the first additive may be included in an amount of 0.05 wt % to 3 wt % based on the total weight of the non-aqueous electrolyte solution.

(4) Second Additive

The non-aqueous electrolyte solution for a lithium secondary battery of the present disclosure may further include a second additive.

The second additive may comprise at least one selected from vinylethylene carbonate (VEC) represented by Formula 3 below, ethyl di(pro-2-yn-1-yl) phosphate (EDP) represented by Formula 4 below, or a combination thereof.

[Formula 3]

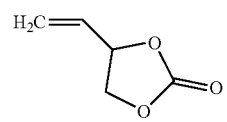

[Formula 4]

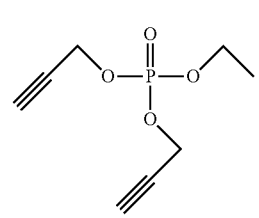

Vinylethylene carbonate (VEC) represented by Formula 3 above may be reduced and decomposed on the surface of a negative electrode, thereby forming a robust SEI film including an inorganic component such as $Li_2CO_3$. Particularly, the vinylethylene carbonate is more thermally stable than vinylene carbonate (VC), and thus, has the advantage of having relatively fewer chemical decomposition reactions even when exposed to high temperatures. Therefore, when vinylene carbonate and the like are used in combination as an additional additive, the vinylene carbonate is oxidized and decomposed on the surface of a positive electrode, thereby forming a film (CEI etc.) in the form of a stable polymer to further strengthen positive electrode interface stabilization. Such an effect is more clearly shown when a positive electrode material made of a high-content Ni material with a Ni content of 80 atm % or greater is used.

In addition, ethyl di(pro-2-yn-1-yl) phosphate which includes all of two or more propargyl functional groups and a phosphate functional group in the structure and which is represented by Formula 4 above is easily reduced and decomposed as the functional groups are radicalized, and thus, may form a high-density stable film on the surface of a negative electrode, and also forms a stable film of P—O series with excellent permeability of Li ions on the surface of a positive electrode, and thus, may have the effect of suppressing an increase in interfacial resistance.

Specifically, the second additive of the present disclosure may comprise each of vinylethylene carbonate (VEC) or ethyl di(pro-2-yn-1-yl) phosphate (EDP) represented by Formula 4 above, or may comprise both vinylethylene carbonate (VEC) and ethyl di(pro-2-yn-1-yl) phosphate (EDP).

When both vinylethylene carbonate (VEC) and ethyl di(pro-2-yn-1-yl) phosphate (EDP) are included as the second additive, vinylethylene carbonate (VEC) and ethyl di(pro-2-yn-1-yl) phosphate (EDP) may be included in a weight ratio of 1:1 or 1:3.

When vinylethylene carbonate (VEC) and ethyl di(pro-2-yn-1-yl) phosphate (EDP) are included in the above ratio, it is possible to further improve an effect of forming an initial film compared to when each additive is used alone, and due to the difference in reduction potentials, an SEI film may be sequentially formed according to a voltage, so that a more stable and robust multi-layered film may be formed.

In addition, in the non-aqueous electrolyte solution of the present disclosure, the first additive and the second additive may be included in a weight ratio of 1:0.5 to 1:60.

When the first additive and the second additive are included in the above ratio, surface tension may be lowered to improve the wettability of the electrolyte solution, and a stable SEI film may be formed without an increase in resistance, so that side reactions between an electrode and the electrolyte solution during high-temperature charge/discharge may be suppressed. Specifically, when the second additive is included in a weight ratio of 0.5 or greater with respect to the first additive, it is possible to form a stable SEI film, thereby suppressing side reactions between the electrode and the electrolyte solution, resulting in suppressing an increase in volume rate, and when the ratio of the second additive with respect to the first additive is 60 or less in a weight ratio, it is possible to prevent an excessively thick film from forming on the surface of an electrode, thereby effectively suppressing an increase in initial interface resistance, and to prevent output degradation. Specifically, the first additive and the second additive may be mixed in a weight ratio of 1:0.5 to 1:30, preferably 1:0.5 to 1:15, and more preferably 1:1 to 1:10.

(5) Third Additive

In addition, the non-aqueous electrolyte solution for a lithium secondary battery of the present disclosure may further comprise a third additive to impart an effect of forming a more stable film on the surface of an electrode.

The third additive may comprise a cyclic carbonate compound except for vinylethylene carbonate (VEC), a compound represented by Formula 2 below, or a combination thereof.

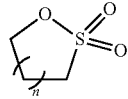

[Formula 2]

In Formula 2, n is an integer of 1 or 2.

The cyclic carbonate compound may be vinylene carbonate (VC) and the like.

When the propargyl group, which is a substituent of the first additive, forms a radical, the vinylene carbonate may react together and form a stable film in the form of a polymer. Therefore, when the third additive is used in combination, an additional effect of forming a more stable film on the surface of the negative electrode may be achieved.

In addition, in Formula 2, n may be 1.

Specifically, the compound represented by Formula 2 above may be 1,3-propane sultone (PS) or 1,4-butane sultone, and preferably, may be 1,3-propane sultone.

When the third additive is included, by improving the stabilization of electrolyte solution bulk properties and the effect of forming a film at the interface of an electrode, a film component may be more firmly modified, and the effect of suppressing lithium precipitation may be achieved. Therefore, when the third additive is used together with the first and second additives, it is possible to effectively improve film durability.

The third additive may be included in an amount of 0.01 to 15 wt %, specifically 0.1 to 10 wt %, based on the total weight of the non-aqueous electrolyte solution.

When the third additive is included in the above range, it is possible to manufacture a secondary battery with further improved overall performance. For example, when the third additive is included in an amount of 0.01 wt % or greater, there is an effect of improving the durability of an SEI film while suppressing an increase in resistance to the maximum. In addition, when the third additive is included in an amount of 10 wt % or less, there may be an effect of long-term maintenance and repair of the SEI film, and excessive side reactions in the electrolyte solution during battery charge/discharge may be prevented, and unreacted substances may be prevented from being present in the electrolyte solution, so that an increase in resistance caused by the unreacted substances may be suppressed.

(6) Fourth Additive

In addition, the non-aqueous electrolyte solution of the present disclosure may further include a fourth additive, if necessary, in order to prevent the non-aqueous electrolyte solution from decomposing in a high-output environment, thereby causing a negative electrode to collapse, or to further improve low-temperature high-rate discharge properties, high-temperature stability, overcharge prevention, the effect of suppressing battery expansion at high temperatures, and the like.

Examples of the fourth additive may include at least one selected from the group consisting of a halogen-substituted carbonate-based compound, a sulfate-based compound, a phosphate-based or phosphite-based compound, a borate-based compound-based compound, a benzene-based compound, an amine-based compound, a silane-based compound, and a lithium salt-based compound.

The halogen-substituted carbonate-based compound may be fluoroethylene carbonate (FEC) and the like.

The sulfate-based compound may be, for example, ethylene sulfate (Esa), trimethylene sulfate (TMS), methyl trimethylene sulfate (MTMS), or the like.

The phosphate-based or phosphite-based compound may be, for example, one or more compounds selected from the group consisting of lithium difluoro(bisoxalato)phosphate, lithium difluorophosphate, tris(trimethylsilyl)phosphate, tris (trimethylsilyl)phosphite, tris(2,2,2-trifluoroethyl)phosphate, and tris(trifluoroethyl)phosphite.

The borate-based compound may be tetraphenylborate, lithium oxalyldifluoroborate (LiODFB) or lithium bisoxalatoborate (LiB(C$_2$O$_4$)$_2$, LiBOB) capable of forming a film on the surface of a negative electrode, or the like.

The benzene-based compound may be fluorobenzene or the like, the amine-based compound may be triethanolamine, ethylenediamine, or the like, and the silane-based compound may be tetravinylsilane or the like.

The lithium salt-based compound is a compound different from the lithium salt included in the non-aqueous electrolyte solution, and may be lithium difluorophosphate ($LiPO_2F_2$, LiDFP), $LiBF_4$, or the like.

Among these other additives, in order to form a more robust SEI film on the surface of a negative electrode during an initial activation process, at least one selected from the group consisting of ethylene sulfate, fluoroethylene carbonate (FEC), $LiBF_4$, and lithium oxalyldifluoroborate (LiODFB) having an excellent effect of forming a film on the surface of a negative electrode may be included.

The fourth additive may be used in combination of two or more compounds, and may be included in an amount of 10 wt % or less based on the total weight of the non-aqueous electrolyte solution in order to prevent side reactions caused by an excessive amount of additives.

Lithium Secondary Battery

In addition, another embodiment of the present disclosure provides a lithium secondary battery including a positive electrode, a negative electrode, a separator interposed between the positive electrode and the negative electrode, and the above-described non-aqueous electrolyte solution of the present disclosure.

The lithium secondary battery of the present disclosure may be manufactured by forming an electrode assembly in which a positive electrode, a negative electrode, and a separator between the positive electrode and the negative electrode are sequentially stacked, followed by accommodating the electrode assembly in a battery case, and then introducing the non-aqueous electrolyte solution of the present disclosure thereto.

A typical method for manufacturing a lithium secondary battery known in the art may be applied to a method for manufacturing the lithium secondary battery of the present disclosure, which will be described in detail below.

(1) Positive Electrode

The positive electrode according to the present disclosure may comprise a positive electrode active material layer including a positive electrode active material, and if necessary, the positive electrode active material layer may further comprise a conductive material and/or a binder.

The positive electrode active material is a compound capable of reversible intercalation and de-intercalation of lithium, and specifically, may include a lithium composite metal oxide containing one or more metals such as cobalt, manganese, nickel or aluminum, and lithium.

Specifically, the positive electrode active material may comprise at least one of a lithium-cobalt-based oxide, a lithium-manganese-based oxide (e.g., $LiMnO_2$, $LiMn_2O_4$, etc.), and a lithium-nickel-manganese-cobalt-based oxide which have high battery capacity properties and safety of a battery. Specifically, the positive electrode active material may comprise a lithium-cobalt-based oxide, or a lithium-nickel-manganese-cobalt-based oxide or a lithium-nickel-cobalt-transition metal (M) oxide represented by Formula 5 below.

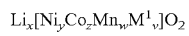  [Formula 5]

In Formula 5, the $M^1$ is a doping element substituted for a transition metal site, and may be one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

The x represents the atomic ratio of lithium in the lithium-nickel-cobalt-manganese-based oxide with respect to the total transition metals, and may be 0.8 to 1.2, preferably 1 to 1.2.

The y represents the atomic ratio of nickel among the transition metals in the lithium-nickel-cobalt-manganese-based oxide, and may be 0.5 to less than 1, preferably 0.7 to less than 1, and more preferably 0.75 to 0.98. As the content of nickel among the transition metals increases, a higher capacity may be implemented, so that it is more advantageous in implementing a high capacity when the nickel content is 0.5 or greater.

The z represents the atomic ratio of cobalt among the transition metals in the lithium-nickel-cobalt-manganese-based oxide, and may be greater than 0 to less than 0.5, preferably 0.01 to 0.3, and more preferably 0.01 to 0.25.

The w represents the atomic ratio of manganese among the transition metals in the lithium-nickel-cobalt-manganese-based oxide, and may be greater than 0 to less than 0.5, preferably 0.01 to 0.3, and more preferably 0.01 to 0.25.

The v represents the atomic ratio of the doping element $M^1$ doped on the transition metal site in the lithium-nickel-cobalt-manganese-based oxide, and may be 0 to 0.2, preferably 0 to 0.1. That is, when the doping element $M^1$ is added, there is an effect of improving the structural stability of the lithium-nickel-cobalt-manganese-based oxide, but when the content of doping elements increases, the capacity may decrease, so that it is preferable that the v is included in the content of 0.2 or less.

Meanwhile, in Formula 1, it may be that $y+z+w+v=1$.

Specific examples of the lithium-nickel-manganese-cobalt-based oxide include $Li(Ni_{0.5}Co_{0.2}Mn_{0.3})O_2$, $Li(Ni_{0.5}Mn_{0.3}Co_{0.2})O_2$, $Li(Ni_{0.6}Mn_{0.2}Co_{0.2})O_2$, $Li(Ni_{0.7}Mn_{0.3})O_2$, $Li(Ni_{0.7}Mn_{0.15}Co_{0.15})O_2$, $Li(Ni_{0.8}Mn_{0.1}Co_{0.2})O_2$, $Li(Ni_{0.86}Mn_{0.05}Co_{0.07}Al_{0.02})O_2$, or the like having a nickel content of 50 atm % or greater, and more specifically, $Li(Ni_{0.7}Mn_{0.1}Co_{0.2})O_2$, $Li(Ni_{0.7}Mn_{0.15}Co_{0.15})O_2$, $Li(Ni_{0.8}Mn_{0.1}Co_{0.1})O_2$, or $Li(Ni_{0.86}Mn_{0.05}Co_{0.07}Al_{0.02})O_2$ having a nickel content of 70 atm % or greater is more preferable.

The positive electrode active material may be included in an amount of 80 wt % to 99 wt %, specifically 90 wt % to 99 wt %, based on the total weight of solids in a positive electrode slurry. At this time, when the content of the positive electrode active material is 80 wt % or less, energy density may be decreased, thereby degrading capacity.

In addition, the conductive material is not particularly limited as long as it has conductivity without causing a chemical change in the battery, and for example, carbon powder such as carbon black, acetylene black, Ketjen black, channel black, furnace black, lamp black, or thermal black; graphite powder of natural graphite, artificial graphite, graphite, or the like, which has a very developed crystal structure; conductive fiber such as carbon fiber or metal fiber; conductive powder such as fluorocarbon powder, aluminum powder, or nickel powder; a conductive whisker such as zinc oxide and potassium titanate; a conductive metal oxide such as titanium oxide; a conductive material such as a polyphenylene derivative, and the like may be used.

The conductive material is typically added in an amount of 1 to 30 wt % based on the total weight of solids in the positive electrode active material layer.

In addition, the binder is a component serving to improve bonding between positive electrode active material particles and adhesion between the positive electrode active material and a current collector, and is typically added in an amount of 1 to 30 wt % based on the total weight of solids in the positive electrode active material layer. Examples of the binder may include a fluorine resin-based binder including polyvinylidene fluoride (PVDF) or polytetrafluoroethylene (PTFE); a rubber-based binder including styrene-butadiene rubber (SBR), acrylonitrile-butadiene rubber, and styrene-isoprene rubber; a cellulose-based binder including carboxyl methyl cellulose (CMC), starch, hydroxypropyl cellulose, and regenerated cellulose; a polyvinyl alcohol-based binder including polyvinyl alcohol; a polyolefin-based binder including polyethylene and polypropylene; a polyimide-based binder; a polyester-based binder; a silane-based binder, and the like.

The positive electrode of the present disclosure as described above may be manufactured by a method for manufacturing a positive electrode known in the art. For example, the positive electrode may be manufactured by a method of preparing a positive electrode slurry by dissolving or dispersing a positive electrode active material, a binder and/or a conductive material in a solvent and applying the positive electrode slurry on a positive electrode current collector, followed by drying and roll-pressing to form a positive electrode active material layer, a method of casting the positive electrode active material layer on a separate support, and then laminating a film obtained by peeling off the support on a positive electrode current collector, or the like.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The solvent may include an organic solvent such as N-methyl-2-pyrrolidone (NMP), and may be used in an amount such that a preferred viscosity is achieved when the positive electrode active material and selectively, a binder and a conductive material, and the like are included. For example, the solvent may be included in an amount such that the concentration of solids in the active material slurry including the positive electrode active material, and selectively, a binder and a conductive material is 10 wt % to 90 wt %, preferably 30 wt % to 80 wt %.

(2) Negative Electrode

Next, the negative electrode will be described.

The negative electrode according to the present disclosure includes a negative electrode active material layer including a negative electrode active material, and the negative electrode active material layer may include, if necessary, a conductive material and/or a binder.

The negative electrode active material may include a silicon-based material capable of doping and undoping lithium.

Representative examples of the silicon-based active material may be Si, $SiO_x$ (0<x<2), an Si—Y alloy (wherein Y is an element selected from the group consisting of an alkali metal, an alkaline earth metal, a transition metal, a Group 13 element, a Group 14 element, a transition metal, a rare earth element, and a combination thereof), and the like. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof. The Si—Y alloy is an alloy which has the highest silicon content among all metal elements based on the total weight of the alloy.

In addition, the silicon-based active material may use a mixture with a carbon material capable of reversible intercalation/de-intercalation of lithium ions.

As the carbon material capable of reversible intercalation/de-intercalation of lithium ions, a carbon-based negative electrode active material commonly used in a lithium ion secondary battery may be used without particular limitation, and representative examples thereof may include a crystalline carbon, an amorphous carbon, or a combination thereof. Examples of the crystalline carbon may include graphite such as an irregular, planar, flaky, spherical, or fibrous natural graphite or artificial graphite, and examples of the amorphous carbon may include soft carbon (low-temperature fired carbon) or hard carbon, mezophase pitch carbides, fired cokes, and the like.

In addition, the negative electrode active material may include at least one selected from the group consisting of a lithium metal, a metal or an alloy of the metal and lithium, and a metal composite oxide.

As the metal, a metal selected from the group consisting of Cu, Ni, Na, K, Rb, Cs, Fr, Be, Mg, Ca, Sr, Si, Sb, Pb, In, Zn, Ba, Ra, Ge, Al, and Sn, or an alloy of the metal and lithium may be used.

As the metal composite oxide, one selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_xFe_2O_3$ (0≤x≤1), $Li_xWO_2$ (0≤x≤1), and $Sn_xMe_{1-x}Me'_yO_z$(Me: Mn, Fe, Pb, Ge; Me': Al, B, P, Si, elements in Group 1, Group 2, and Group 3 of the periodic table, halogen; 0<x≤1; 1≤y≤3; 1≤z≤8) may be used.

The negative electrode active material may be included in an amount of 80 wt % to 99 wt % based on the total weight of solids in a negative electrode slurry.

The conductive material is a component for further improving the conductivity of the negative electrode active material, and may be added in an amount of 1 to 20 wt % based on the total weight of solids in the negative electrode active material layer. The conductive material is not particularly limited as long as it has conductivity without causing a chemical change in the battery, and for example, graphite such as natural graphite or artificial graphite; carbon black such as acetylene black, Ketjen black, channel black, furnace black, lamp black, and thermal black; conductive fiber such as carbon fiber and metal fiber; conductive powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

The binder is a component for assisting in binding between a conductive material, an active material, and a current collector, and is typically added in an amount of 1 to 30 wt % based on the total weight of solids in a negative electrode active material layer. Examples of the binder may include a fluorine resin-based binder including polyvinylidene fluoride (PVDF) or polytetrafluoroethylene (PTFE); a rubber-based binder including styrene-butadiene rubber (SBR), acrylonitrile-butadiene rubber, and styrene-isoprene rubber; a cellulose-based binder including carboxyl methyl cellulose (CMC), starch, hydroxypropyl cellulose, and regenerated cellulose; a polyvinyl alcohol-based binder including polyvinyl alcohol; a polyolefin-based binder including polyethylene and polypropylene; a polyimide-based binder; a polyester-based binder; a silane-based binder, and the like.

The negative electrode may be manufactured by a method for manufacturing a negative electrode known in the art. For example, the negative electrode may be manufactured by preparing a negative electrode slurry by dissolving or dispersing a negative electrode active material, and selectively, a binder and a conductive material in a solvent and applying the negative electrode slurry on a negative electrode current collector, followed by roll-pressing and drying to form a negative electrode active material layer, or by casting the negative electrode active material layer on a separate support, and then laminating a film obtained by peeling off the support on a negative electrode current collector.

The negative electrode current collector typically has a thickness of 3 to 500 µm. The negative electrode current collector is not particularly limited as long as it has high conductivity without causing a chemical change in the battery, and for example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the biding force of a negative electrode active material, and the negative electrode current collector may be used in various forms of such as a film, a sheet, a foil, a net, a porous body, a foam body, and a non-woven fabric body.

The solvent may include water or an organic solvent such as NMP, an alcohol, or the like, and may be used in an amount such that a preferred viscosity is achieved when the negative electrode active material, and selectively, a binder, a conductive material, and the like are included. For example, the solvent may be included in an amount such that the concentration of solids in an active material slurry including the negative electrode active material, and selectively, a binder and a conductive material is 50 wt % to 75 wt %, preferably 40 wt % to 70 wt %.

(3) Separator

The separator included in a lithium secondary battery of the present disclosure may use a typical porous polymer film commonly used, and for example, a porous polymer film prepared with a polyolefin-based polymer such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present disclosure is not limited thereto.

The external shape of the lithium secondary battery of the present disclosure is not particularly limited, but may be a cylindrical shape using a can, a square shape, a pouch shape, a coin shape, or the like.

Hereinafter, the present disclosure will be described in detail with reference to examples. However, the examples according to the present disclosure may be modified into other various forms, and the scope of the present disclosure should not be construed as being limited to the examples described below. The examples of the present disclosure are provided to describe the present disclosure more fully to those skilled in the art.

EXAMPLES

Example 1

Preparation of Non-Aqueous Electrolyte Solution for Lithium Secondary Battery

In a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 0.3 wt % of vinylethylene carbonate (hereinafter, referred to as "VEC") as a second additive, 3.0 wt % of vinylene carbonate (hereinafter, referred to as "VC") and 0.5 wt % of 1,3-propane sultone (hereinafter, referred to as "PS") as a third additive, and 1.0 wt % of ethylene sulfate (hereinafter, referred to as "Esa") as a fourth additive were added thereto to prepare a non-aqueous electrolyte solution (see Table 1 below).

(Manufacturing of Secondary Battery)

To N-methyl-2-pyrrolidone (NMP), a positive electrode active material $Li(Ni_{0.86}Mn_{0.05}Co_{0.07}Al_{0.02})O_2$, a conductive material (carbon black), and a binder (polyvinylidene fluoride) were added in a weight ratio of 97.5:1:1.5 to prepare a positive electrode slurry (solid content: 50 wt %). The positive electrode slurry was applied and dried on an aluminum (Al) thin film, which was a positive electrode current collector having a thickness of 12 µm, and then roll-pressed to manufacture a positive electrode.

A negative electrode active material (graphite), a binder (SBR-CMC), and a conductive material (carbon black) were added in a weight ratio of 97.5:1.5:1.0 to water, which was a solvent, to prepare a negative electrode slurry (solid content 60 wt %). The negative electrode slurry was applied and dried on a copper (Cu) thin film, which was a negative electrode current collector having a thickness of 6 µm, and then roll-pressed to manufacture a negative electrode.

The positive electrode, a polyolefinic porous separator on which inorganic particles ($Al_2O_3$) were applied, and the negative electrode were sequentially stacked to manufacture an electrode assembly, and the electrode assembly was wound in the form of a jelly-roll, which was accommodated in a cylindrical battery case, followed by injecting the non-aqueous electrolyte solution for a lithium secondary battery thereto to manufacture a cylindrical lithium secondary battery having a driving voltage of 4.2 V or higher.

Example 2

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 0.3 wt % of ethyl di(pro-2-yn-1-yl) phosphate (hereinafter, referred to as "EDP") as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 3

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 0.1 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 4

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 0.5 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 5

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 1.0 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 6

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 3.0 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 7

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 6.0 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 8

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a as a first additive, 0.04 wt % of EDP as a second additive, 3.0 wt % of VC and 0.5 wt % of PS as a third additive, and 1.0 wt % of Esa as a fourth additive were added thereto to prepare a non-aqueous electrolyte solution (see Table 1 below).

Example 9

A lithium secondary battery was manufactured in the same manner as in Example 1 except that a positive electrode was manufactured using $Li(Ni_{0.7}Mn_{0.1}Co_{0.2})O_2$ as a positive electrode active material (see Table 1 below).

Example 10

A lithium secondary battery was manufactured in the same manner as in Example 1 except that a positive electrode was manufactured using $Li(Ni_{0.6}Mn_{0.2}Co_{0.2})O_2$ as a positive electrode active material (see Table 1 below).

Comparative Example 1

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.3 wt % of VEC, 3.0 wt % of VC, 0.5 wt % of PS, and 1.0 wt % of Esa were added thereto to prepare a non-aqueous electrolyte solution (see Table 1 below).

Comparative Example 2

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.3 wt % of EDP, 3.0 wt % of VC, 0.5 wt % of PS, and 1.0 wt % of Esa were added thereto to prepare a non-aqueous electrolyte solution (see Table 1 below).

Comparative Example 3

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, $LiPF_6$ was dissolved to 1.0 M, and then 0.1 wt % of a compound represented by Formula 1a, 3.0 wt % of VC and 0.5 wt % of PS, and 1.0 wt % of Esa as a fourth additive were added thereto to prepare a non-aqueous electrolyte solution (see Table 1 below).

Comparative Example 4

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, LiPF6 was dissolved to 1.0 M, and then 3.0 wt % of VC, 0.5 wt % of PS, and 1.0 wt % of Esa were added thereto to prepare a non-aqueous electrolyte solution (see Table 1 below).

Comparative Example 5

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, LiPF$_6$ was dissolved to 1.0 M, and then 3.0 wt % of VC, 0.5 wt % of PS, 1.0 wt % of Esa, and 1.0 wt % of lithium difluorophosphate (LiDFP) were added thereto to prepare a non-aqueous electrolyte solution (see Table 1 below).

Comparative Example 6

A lithium secondary battery was manufactured in the same manner as in Example 1 except that in a non-aqueous organic solvent in which ethylene carbonate (EC) and ethyl methyl carbonate (EMC) were mixed in a volume ratio of 30:70, LiPF$_6$ was dissolved to 1.0 M, and then 3.0 wt % of VC, 0.5 wt % of PS, 1.0 wt % of Esa, and 5.0 wt % of fluoroethylene carbonate (FEC) were added thereto to prepare a non-aqueous electrolyte solution (see Table 1 below).

Comparative Example 7

A lithium secondary battery was manufactured in the same manner as in Comparative Example 1 except that a positive electrode was manufactured using Li(Ni$_{0.7}$Mn$_{0.1}$Co$_{0.2}$)O$_2$ as a positive electrode active material (see Table 1 below).

Comparative Example 8

A lithium secondary battery was manufactured in the same manner as in Comparative Example 1 except that a positive electrode was manufactured using Li(Ni$_{0.6}$Mn$_{0.2}$Co$_{0.2}$)O$_2$ as a positive electrode active material (see Table 1 below).

TABLE 1

| | | \multicolumn{6}{c}{Non-aqueous electrolyte solution} | | | |
|---|---|---|---|---|---|---|---|---|---|---|
| | | First additive | | Second additive | | Weight ratio of first additive: second additive | Third additive | | Fourth additive | |
| | Positive electrode active material | Type | Content (%) | Type | Content (%) | | Type | Content (%) | Type | Content (%) |
| Example 1 | Li(Ni$_{0.86}$Mn$_{0.05}$Co$_{0.07}$Al$_{0.02}$)O$_2$ | Formula 1a | 0.1 | VEC | 0.3 | 1:3 | VC/PS | 3.0/0.5 | ESa | 1.0 |
| Example 2 | | Formula 1a | 0.1 | EDP | 0.3 | 1:3 | VC/PS | 3.0/0.5 | ESa | 1.0 |
| Example 3 | | Formula 1a | 0.1 | EDP | 0.1 | 1:1 | VC/PS | 3.0/0.5 | ESa | 1.0 |
| Example 4 | | Formula 1a | 0.1 | EDP | 0.5 | 1:5 | VC/PS | 3.0/0.5 | ESa | 1.0 |
| Example 5 | | Formula 1a | 0.1 | EDP | 1.0 | 1:10 | VC/PS | 3.0/0.5 | ESa | 1.0 |
| Example 6 | | Formula 1a | 0.1 | EDP | 3.0 | 1:30 | VC/PS | 3.0/0.5 | ESa | 1.0 |
| Example 7 | | Formula 1a | 0.1 | EDP | 6.0 | 1:60 | VC/PS | 3.0/0.5 | ESa | 1.0 |
| Example 8 | | Formula 1a | 0.1 | EDP | 0.04 | 1:0.4 | VC/PS | 3.0/0.5 | ESa | 1.0 |
| Example 9 | NCM712 | Formula 1a | 0.1 | VEC | 0.3 | 1:3 | VC/PS | 3.0/0.5 | ESa | 1.0 |
| Example 10 | NCM622 | Formula 1a | 0.1 | VEC | 0.3 | 1:3 | VC/PS | 3.0/0.5 | ESa | 1.0 |
| Comparative Example 1 | Li(Ni$_{0.86}$Mn$_{0.05}$Co$_{0.07}$Al$_{0.02}$)O$_2$ | — | — | VEC | 0.3 | — | VC/PS | 3.0/0.5 | ESa | 1.0 |
| Comparative Example 2 | | — | — | EDP | 0.3 | — | VC/PS | 3.0/0.5 | ESa | 1.0 |
| Comparative Example 3 | | Formula 1a | 0.1 | — | — | — | VC/PS | 3.0/0.5 | ESa | 1.0 |
| Comparative Example 4 | | — | — | — | — | — | VC/PS | 3.0/0.5 | ESa | 1.0 |
| Comparative Example 5 | | — | — | — | — | — | VC/PS | 3.0/0.5 | ESa/LiDFP | 1.0/1.0 |
| Comparative Example 6 | | — | — | — | — | — | VC/PS | 3.0/0.5 | ESa/FEC | 1.0/5.0 |
| Comparative Example 7 | NCM712 | — | — | VEC | 0.3 | — | VC/PS | 3.0/0.5 | ESa | 1.0 |
| Comparative Example 8 | NCM622 | — | — | VEC | 0.3 | — | VC/PS | 3.0/0.5 | ESa | 1.0 |

In Table 1, the abbreviations of compounds respectively refer to the followings.
VEC: Vinylethylene carbonate
EDP: Ethyl di(pro-2-yn-1-yl) phosphate
VC: Vinylene carbonate
PS: 1,3-propane sultone
ESa: Ethylene sulfate
LiDFP: Lithium difluorophosphate
FEC: Fluoroethylene carbonate
NCM 712: $Li(Ni_{0.7}Mn_{0.1}Co_{0.2})O_2$
NCM 622: $Li(Ni_{0.6}Mn_{0.2}Co_{0.2})O_2$

EXPERIMENTAL EXAMPLES

Experimental Example 1: Volume Increase Rate Evaluation Experiment

The lithium secondary batteries manufactured in Examples 1 to 10 and the lithium secondary batteries manufactured in Comparative Examples 1 to 8 were each charged to 4.2 V with 0.33 C, and then after the charge, initial volume values thereof were measured by the Archimedes' method using distilled water.

Thereafter, each of the lithium secondary batteries was stored at 60° C. for 12 weeks in the state of SOC 100%, and then an increase rate of volume of the lithium secondary battery based on the initial volume, which was increased after the high-temperature storage, was measured by the Archimedes' method, and the degree of the measured volume change was calculated as a percentage (%) and shown in Table 2 below.

TABLE 2

|  | 60° C. Volume increase rate (12 weeks, 4.2 V) (%) |
| --- | --- |
| Example 1 | 2.4 |
| Example 2 | 2.1 |
| Example 3 | 2.9 |
| Example 4 | 1.8 |
| Example 5 | 1.5 |
| Example 6 | 1.3 |
| Example 7 | 1.3 |
| Example 8 | 3.5 |
| Example 9 | 2.0 |
| Example 10 | 1.5 |
| Comparative Example 1 | 15.4 |
| Comparative Example 2 | 13.1 |
| Comparative Example 3 | 10.5 |
| Comparative Example 4 | 30.7 |
| Comparative Example 5 | 12.4 |
| Comparative Example 6 | 35.4 |
| Comparative Example 7 | 10.2 |
| Comparative Example 8 | 6.5 |

Referring to Table 2 above, the volume increase rate after the high-temperature storage of each of the lithium secondary batteries manufactured in Examples 1 to 10 provided with the non-aqueous electrolyte solution of the present disclosure is 3.5% or less, which is significantly decreased compared to that of each of the lithium secondary batteries of Comparative Examples 1 to 8.

Meanwhile, the volume increase rate after the high-temperature storage of the lithium secondary battery of Example 8 including a slightly small amount of the second additive is 3.5%, which is slightly increased compared to that of each of the lithium secondary batteries manufactured in Examples 1 to 7.

Meanwhile, it can be seen that in the case of the lithium secondary battery of Example 9, which includes the positive electrode containing $Li(Ni_{0.7}Mn_{0.1}Co_{0.2})O_2$ as the positive electrode active material and includes the non-aqueous electrolyte solution of the present disclosure, the volume increase rate after the high-temperature storage is decreased by about 65% compared to that of the lithium secondary battery of Comparative Example 7, and in the case of the lithium secondary battery of Example 10, which includes the positive electrode containing $Li(Ni_{0.6}Mn_{0.2}Co_{0.2})O_2$ as the positive electrode active material and includes the non-aqueous electrolyte solution of the present disclosure, the volume increase rate after the high-temperature storage is decreased by about 75% compared to that of the lithium secondary battery of Comparative Example 8. On the other hand, it can be seen that in the case of the lithium secondary battery of Example 1, which uses the positive electrode containing $Li(Ni_{0.86}Mn_{0.05}Co_{0.07}Al_{0.02})O_2$ as the positive electrode active material and uses the non-aqueous electrolyte solution of the present disclosure, the volume increase rate after the high-temperature storage is decreased by about 80% compared to that of the lithium secondary battery of Comparative Example 1, which is provided with a non-aqueous electrolyte solution including only the second additive and the third additive, except for the first additive. Referring to these results, it can be confirmed that when a positive electrode containing a positive electrode active material having a nickel content of 80 atm % or greater and the non-aqueous electrolyte solution of the present disclosure are applied in combination, the effect of suppressing a volume increase rate is further improved.

Experimental Example 2. Resistance Increase Rate During High-Temperature Storage The secondary batteries manufactured in Examples 1 to 7, 9, and 10 and the secondary batteries manufactured in Comparative Examples 1 to 8 were each activated with 0.1 C CC, and then de-gassed.

Thereafter, the secondary batteries were charged at 25° C. to 4.20 V with 0.33 C CC under the condition of constant current-constant voltage (CC-CV), and then under the condition of SOC 50%, the secondary batteries were pulse discharged at a 2.5 C rate and a voltage dropped for 10 seconds was measured to obtain an initial resistance value.

Thereafter, after having been stored at a high temperature of 60° C. for 12 weeks, the batteries were charged to SOC 50%, and then pulse discharged at a 2.5 C rate and a voltage dropped for 10 seconds was measured to obtain a resistance value after the high-temperature storage, and an increase rate (%) in resistance, which was increased compared to the initial resistance, was calculated and shown in Table 3 below. At this time, the voltage drop was measured using the PNE-0506 charger/discharger (Manufacturer: PNE solution, 5 V, 6 A).

TABLE 3

|  | Resistance increase rate after 60° C. high-temperature storage (%) |
| --- | --- |
| Example 1 | 7.1 |
| Example 2 | 6.8 |
| Example 3 | 7.5 |
| Example 4 | 6.5 |
| Example 5 | 5.9 |
| Example 6 | 5.6 |
| Example 7 | 5.6 |
| Example 9 | 5.2 |
| Example 10 | 3.5 |

TABLE 3-continued

| | Resistance increase rate after 60° C. high-temperature storage (%) |
|---|---|
| Comparative Example 1 | 17.5 |
| Comparative Example 2 | 15.4 |
| Comparative Example 3 | 12.4 |
| Comparative Example 4 | 45.5 |
| Comparative Example 5 | 13.4 |
| Comparative Example 6 | 47.7 |
| Comparative Example 7 | 11.2 |
| Comparative Example 8 | 8.4 |

Referring to Table 3, the resistance increase rate after the high-temperature storage of each of the lithium secondary batteries manufactured in Examples 1 to 7, 9, and 10 provided with the non-aqueous electrolyte solution of the present disclosure is about 7.1% or less, which is significantly improved compared to that of each of the lithium secondary batteries of Comparative Examples 1 to 8. That is, each of the secondary batteries of Examples provided with the non-aqueous electrolyte solution of the present disclosure forms a stable SEI film on an electrode surface, so that the film is suppressed from being destroyed at high temperatures even when the battery is exposed to high temperatures, and accordingly, there is little additional electrolyte decomposition due to the destruction of the film, which seems to bring an excellent effect of suppressing an increase in resistance even after high-temperature storage.

Meanwhile, it can be seen that in the case of the lithium secondary battery of Example 9, which includes the positive electrode containing $Li(Ni_{0.7}Mn_{0.1}Co_{0.2})O_2$ as the positive electrode active material and includes the non-aqueous electrolyte solution of the present disclosure, the resistance increase rate is decreased by about 54% compared to that of the lithium secondary battery of Comparative Example 7, and in the case of the lithium secondary battery of Example 10, which includes the positive electrode containing $Li(Ni_{0.6}Mn_{0.2}Co_{0.2})O_2$ as the positive electrode active material and includes the non-aqueous electrolyte solution of the present disclosure, the resistance increase rate is decreased by about 58% compared to that of the lithium secondary battery of Comparative Example 8. On the other hand, it can be seen that in the case of the lithium secondary battery of Example 1, which uses the positive electrode containing $Li(Ni_{0.861}Mn_{0.05}Co_{0.07}Al_{0.02})O_2$ as the positive electrode active material and uses the non-aqueous electrolyte solution of the present disclosure, the resistance increase rate is decreased by about 59% compared to that of the lithium secondary battery of Comparative Example 1, which is provided with a non-aqueous electrolyte solution including only the second additive and the third additive, except for the first additive. Referring to these results, it can be seen that when a positive electrode containing a positive electrode active material having a nickel content of 80 atm % or greater and the non-aqueous electrolyte solution of the present disclosure are applied in combination, the effect of suppressing a resistance increase rate is further improved.

Experimental Example 3. Evaluation of Initial Resistance

The lithium secondary batteries manufactured in Examples 1 to 7 and the lithium secondary battery manufactured in Comparative Examples 6 were each activated with 0.1 C CC, and then de-gassed.

Thereafter, the secondary batteries were charged at 25° C. to 4.20 V with 0.33 C CC under the condition of constant current-constant voltage (CC-CV), and then under the condition of SOC 50%, the secondary batteries were pulse discharged at a 2.5 C rate and a voltage dropped for 10 seconds was measured to obtain an initial resistance value. The measured initial resistance values are shown in Table 4 below.

TABLE 4

| | 25° C., SOC 50%, Initial resistance value (mohm) |
|---|---|
| Example 1 | 15.4 |
| Example 2 | 13.1 |
| Example 3 | 9.8 |
| Example 4 | 15.2 |
| Example 5 | 17.5 |
| Example 6 | 20.3 |
| Example 7 | 27.7 |
| Comparative Example 6 | 21.4 |

Referring to Table 4, the initial resistance value of each of the lithium secondary batteries manufactured in Examples 1 to 5 provided with the non-aqueous electrolyte solution of the present disclosure is 17.5% or less.

On the other hand, the initial resistance value of the lithium secondary battery of Comparative Example 6 which does not include both the first and second additives of the present disclosure is 21.4%, which is significantly increased compared to that of each of the lithium secondary batteries manufactured in Examples 1 to 5.

Meanwhile, the initial resistance values of the lithium secondary batteries of Examples 6 and 7 which include a slightly large amount of the second additive are respectively 20.3% and 27.7%, which is significantly increased compared to that of each of the lithium secondary batteries manufactured in Examples 1 to 5.

The invention claimed is:

1. A non-aqueous electrolyte solution for a lithium secondary battery, the non-aqueous electrolyte solution comprising:
    a lithium salt;
    a non-aqueous organic solvent;
    a first additive comprising a compound represented by Formula 1;
    a second additive comprising vinylethylene carbonate (VEC), ethyl di(pro-2-yn-1-yl) phosphate (EDP), or a combination thereof; and
    a third additive including a cyclic carbonate compound except for vinylethylene carbonate (VEC), a compound represented by Formula 2, or a combination thereof:

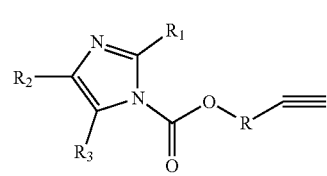

(Formula 1)

wherein in Formula 1,
R is a substituted or unsubstituted alkylene group having 1 to 3 carbon atoms, and
$R_1$ to $R_3$ are each independently hydrogen, an alkyl group having 1 to 3 carbon atoms, or —CN, and

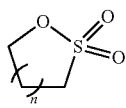

[Formula 2]

wherein in Formula 2, n is an integer of 1 or 2, provided that the non-aqueous electrolyte solution does not comprise propyl propionate.

2. The non-aqueous electrolyte solution of claim 1, wherein:

R is a substituted or unsubstituted alkylene group having 1 carbon atom or 2 carbon atoms; and $R_1$ to $R_3$ are each independently hydrogen or an alkyl group having 1 carbon atom or 2 carbon atoms.

3. The non-aqueous electrolyte solution of claim 1, wherein the compound represented by Formula 1 is a compound represented by Formula 1a:

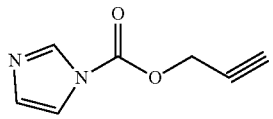

[Formula 1a]

4. The non-aqueous electrolyte solution of claim 1, wherein the first additive is included in an amount of 0.05 wt % to 5 wt % based on the total weight of the non-aqueous electrolyte solution.

5. The non-aqueous electrolyte solution of claim 1, wherein the first additive and the second additive are included in a weight ratio of 1:0.5 to 1:60.

6. The non-aqueous electrolyte solution of claim 1, wherein the first additive and the second additive are included in a weight ratio of 1:0.5 to 1:30.

7. The non-aqueous electrolyte solution of claim 1, wherein the first additive and the second additive are included in a weight ratio of 1:0.5 to 1:15.

8. The non-aqueous electrolyte solution of claim 1, wherein the second additive is ethyl di(pro-2-yn-1-yl) phosphate (EDP).

9. The non-aqueous electrolyte solution of claim 1, wherein the cyclic carbonate compound is vinylene carbonate (VC).

10. The non-aqueous electrolyte solution of claim 1, wherein the compound represented by Formula 2 is 1,3-propane sultone (PS) or 1,4-butane sultone.

11. The non-aqueous electrolyte solution of claim 1, wherein the third additive is a mixture including vinylene carbonate (VC) and the compound represented by Formula 2.

12. The non-aqueous electrolyte solution of claim 1, further comprising at least one fourth additive of a halogen-substituted carbonate-based compound, a sulfate-based compound, a phosphate-based or phosphite-based compound, a borate-based compound, a benzene-based compound, an amine-based compound, a silane-based compound, or a lithium salt-based compound.

13. A lithium secondary battery comprising a negative electrode, a positive electrode, a separator interposed between the negative electrode and the positive electrode, and a non-aqueous electrolyte solution for a lithium secondary battery, wherein the non-aqueous electrolyte solution includes:

a lithium salt; a non-aqueous organic solvent;

a first additive comprising a compound represented by Formula 1;

a second additive comprising vinylethylene carbonate (VEC), ethyl di(pro-2-yn-1-yl) phosphate (EDP), or a combination thereof; and a third additive including a cyclic carbonate compound except for vinylethylene carbonate (VEC), a compound represented by Formula 2, or a combination thereof:

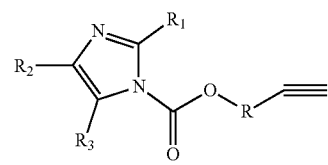

(Formula 1)

wherein in Formula 1,

R is a substituted or unsubstituted alkylene group having 1 to 3 carbon atoms, and $R_1$ to $R_3$ are each independently hydrogen, an alkyl group having 1 to 3 carbon atoms, or —CN, and

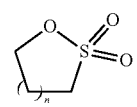

[Formula 2]

wherein in Formula 2, n is an integer of 1 or 2, provided that the non-aqueous electrolyte solution does not comprise propyl propionate.

14. The lithium secondary battery of claim 13, wherein the positive electrode comprises a positive electrode active material made of a lithium transition metal oxide containing one or more metals selected from cobalt, manganese, nickel, or aluminum and lithium.

15. The lithium secondary battery of claim 13, wherein the first additive and the second additive are included in a weight ratio of 1:0.5 to 1:60.

\* \* \* \* \*